US005264202A

United States Patent [19]

Snyder

[11] Patent Number: 5,264,202

[45] Date of Patent: Nov. 23, 1993

[54] COMBINED PREREFORMER AND CONVECTIVE HEAT TRANSFER REFORMER

[75] Inventor: Gregory D. Snyder, New Tripoli, Pa.

[73] Assignee: Air Products and Chemicals, Inc., Allentown, Pa.

[21] Appl. No.: 864,716

[22] Filed: Apr. 7, 1992

Related U.S. Application Data

[63] Continuation of Ser. No. 608,134, Nov. 1, 1990, abandoned.

[51] Int. Cl.[5] .............. C01B 3/38

[52] U.S. Cl. .............. 423/653; 423/652

[58] Field of Search .............. 423/652, 653

[56] References Cited

U.S. PATENT DOCUMENTS

| | | | |
|---|---|---|---|
| 3,988,425 | 10/1976 | Jockel et al. | 423/415 |
| 4,101,376 | 7/1978 | Cornelius et al. | 176/39 |
| 4,104,201 | 8/1978 | Banks et al. | 252/466 |
| 4,417,905 | 11/1983 | Banks et al. | 48/214 |
| 4,631,182 | 12/1986 | Tottrup et al. | 423/652 |
| 4,810,472 | 3/1989 | Andrew et al. | 422/197 |
| 4,824,658 | 4/1989 | Karafian et al. | 423/652 |
| 4,919,844 | 4/1990 | Wang | 252/373 |

OTHER PUBLICATIONS

D. N. Clark & W. G. S. Hensen; "Opportunities for Savings With Prereformers"; 1987 Ammonia Symposium AICHE; Aug. 16, 1987.

*Primary Examiner*—Ferris H. Lander

*Attorney, Agent, or Firm*—Geoffrey L. Chase; James C. Simmons; William F. Marsh

[57] ABSTRACT

A process and apparatus are described wherein a convective heat transfer reformation of hydrocarbons is conducted with at least an initial prereforming section which decreases the fuel requirements for a given reformate production of hydrogen and carbon monoxide-containing product and/or reduces the size of the reformer.

10 Claims, 4 Drawing Sheets

10
12
36
14
16
18
20
22
23
24
25
26
28
30
32
34
38
40
42
44
46
48
50
52

TEMP. DEG. F
1800
1700
1600
1500
1400
1300
1200
1100
1000
900
800
700
0
200
400
600
800
1000
1200
1400
1600
1800
2000
DUTY, M BTU/HR
a
b
c
d
e

TEMP. DEG. F
1800
1700
1600
1500
1400
1300
1200
1100
1000
900
800
700
0
200
400
600
800
1000
1200
1400
1600
1800
2000
DUTY, M BTU/HR
a'
b'
c'
d'
e'

COMBINED PREREFORMER AND CONVECTIVE HEAT TRANSFER REFORMER

This is a continuation of application Ser. No. 07/608,134 filed Nov. 01, 1990 and now abandoned.

TECHNICAL FIELD OF THE INVENTION

The present invention is directed to the field of reforming hydrocarbons ultimately to hydrogen and carbon monoxide-containing product gases. More specifically, the present invention is directed to at least initial reforming of hydrocarbons, such as methane, to hydrogen and carbon monoxide at temperatures below conventional reforming temperatures of reaction using catalysts of high nickel content and wherein the heat of the reaction is supplied convectively from a heat source, such as an elevated temperature process stream.

BACKGROUND OF THE PRIOR ART

Hydrogen, carbon monoxide and/or synthesis gas are produced by the catalytic reaction of hydrocarbons and steam at high temperature and elevated pressure. In a conventional steam-methane reformer, the heat required for the endothermic reforming reaction is provided by the combustion of fuel in a reformer furnace. In an autothermal reformer, the heat duty is provided by partial combustion of the process feed gas prior to reforming in the catalyst bed. The reformer size is dependent upon the heat duty requirements of the reforming reaction. The cost of the reforming can be as much as 40% of the equivalent costs for the synthesis gas plant. The reformer fuel for a conventional steam-methane reformer accounts for 10 to 30% of the plant energy costs. Costs are similar for the oxygen and the portion of the process feed gas which is combusted in an autothermal reformer.

A convective heat transfer reformer can be integrated with either a conventional steam methane reformer or an autothermal reformer to utilize high level waste heat to reform about 20–40% of the feed gas. A convective heat transfer reformer can recover waste heat from the synthesis gas produced in a conventional or autothermal reformer to heat and reform feed gas. By reforming a portion of the steam-methane feed in a convective heat transfer reformer, the size of the primary reformer, either conventional or autothermal, is reduced. Conventional reformer fuel requirements or autothermal reformer oxygen and feed requirements are also reduced.

A convective heat transfer reformer can consist of a pressurized shell and a bundle of tubes containing conventional reforming catalyst. Feed gas consisting of steam and methane flows through the catalyst filled tubes in a direction countercurrent to hot synthesis gas flowing on the shell side. The feed gas is heated and reformed as it flows through the catalyst filled tubes.

Several processes have been proposed in the prior art, that incorporated a conventional steam-methane reformer with either a convective heat transfer reformer, or a prereformer using high nickel content prereforming catalyst. Several prereforming catalysts have also been proposed.

U.S. Pat. No. 4,824,658 proposes a convective reformer used to partially reform a feed of steam and hydrocarbons. The partially reformed feed is further reformed in a primary steam reformer furnace or autothermal reformer. Waste heat recovered from the primary reformer effluent supplies the heated reaction for the partial reformation of the feed in the convective heat transfer reformer.

U.S. Pat. No. 4,919,844 proposes a process that integrates a convective heat transfer reformer with a conventional steam-methane reformer. A portion of the hydrocarbon-steam feed stream is reformed in the convective heat transfer reformer. The heat of the reaction for the convective heat transfer reformer is supplied by recovering waste heat from the reformed reaction products of both the conventional reformer and the convective heat transfer reformer.

U.S. Pat. No. 4,631,182 offers a two-step process for the production of hydrogen and/or carbon monoxide. In the first step, a portion of the hydrocarbon and steam feed is passed through an adiabatic reactor containing a prereforming catalyst. The feed is reformed at low temperature and normal operating pressure. The effluent is combined with the outlet from a direct reduction iron ore furnace. In the second step, the combined stream is further reformed in a tubular furnace reformer to produce hydrogen and carbon monoxide for use in the reduction furnace. This process shifts a portion of the reforming duty to an adiabatic packed bed reactor and reduces the reformer fuel requirements.

U.S. Pat. No. 4,104,201 describes a steam reforming catalyst suited for low temperature and high pressure operation. The catalyst contains 25 to 75% nickel and some ruthenium. Resistance to polymer deactivation is asserted.

U.S. Pat. No. 4,417,905 proposes a 50 to 65% nickel catalyst and process for the production of methane-containing gases from hydrocarbons and steam. The new catalyst has a higher nickel concentration and operates at lower temperatures than conventional reforming catalyst. The catalyst is also resistant to sintering and deactivation by polymer formation.

U.S. Pat. No. 3,988,425 couples an adiabatic prereformer with a tubular reformer for reforming a light hydrocarbon feed stock having an average carbon number not greater than 15, at a steam to carbon molar ratio between 1.1 and 1.7. The prereformer catalyst contains 25 to 70 wt.% nickel, operates at temperatures of 300° to 500° C. and cracks the light hydrocarbon feedstock to methane. The methane-steam mixture is then sent to the tubular reformer in which hydrogen and carbon monoxide are produced.

U.S. Pat. No. 4,810,472 discloses an apparatus for conducting an endothermic catalytic reaction wherein closed ended, externally heated reformer tubes are employed. The inner return tubes are insulated so that there is only a small temperature drop between the reacted gas leaving the catalyst zone and entering the return tubes and the gas leaving the return tubes. The outer, closed end, tubes preferably have fins to increase the surface area, and are surrounded by sheaths through which a heating medium passes. The heating medium is preferably hot gas obtained by subjecting the primary reformed gas to secondary reforming.

The literature article, "Opportunities for Savings with Prereformers" by D. N. Clark and W. G. S. Henson delivered at the 1987 Ammonia Symposium, American Institute of Chemical Engineers, Aug. 16, 1987, discloses the integration of conventional reformers with adiabatic prereformers. The figures in the article, particularly FIG. 3B and FIG. 3C, disclose an adiabatic prereformer operating using the waste heat from the flue gas of a conventionally fired primary reformer to reheat the prereformer effluent.

The integration of the convective heat transfer reformer with a primary steam methane reformer in a hydrogen or synthesis gas plant, reduces the size and costs of the primary reformer and energy requirements of the plant. The costs savings associated with the reduced primary reformer size can be offset by the cost of the convective heat transfer reformer however. To achieve the full benefit of an integrated primary reformer and convective heat transfer reformer process cycle, capital costs must be further reduced. The present invention achieves desirable capital cost reductions by the unique combination of features in a convective heat transfer reformation as set forth below.

BRIEF SUMMARY OF THE INVENTION

The present invention is a process for at least prereforming a hydrocarbon feed stream in a convective heat transfer reformation to produce a reformate containing hydrogen and carbon monoxide comprising the steps of introducing a hydrocarbon feed stream into a convective heat transfer reformation zone, heating the feed stream essentially convectively by an elevated temperature heat source, contacting the feed stream at least initially in the convective heat transfer reformation zone with a prereforming catalyst having a high nickel content and prereforming at least a portion of the feed stream into hydrogen and carbon monoxide.

Preferably, the prereformation is conducted at a temperature no greater than 1200° F.

Preferably, the source of convective heat for the prereforming is a process stream.

Preferably, the prereforming catalyst has a nickel content of at least 20 wt%.

Exemplarily, the hydrocarbon feedstream is essentially methane.

Preferably, the hydrocarbon feedstream contacts a prereforming catalyst in an initial portion of the convective heat transfer reformation zone and contacts a conventional reforming catalyst in the remainder of the convective heat transfer reformation zone.

Preferably, the convective heat transfer reformation is heated convectively by the product of a primary reformation.

Preferably, the reformation is conducted at a temperature in the range of approximately 800° to 1050° F.

Preferably, the prereforming catalyst has a nickel content of approximately 25 to 80 wt%.

Optimally, the prereforming catalyst has a nickel content of approximately 25 to 60 wt%.

More specifically, the present invention is a process for prereforming and primary reforming a methane-containing feed stream to produce a hydrogen and carbon monoxide reformate comprising the steps of preheating a methane-containing feed stream against an elevated temperature heat source, mixing the preheated feed stream with steam, splitting the mixed stream into a feed to a primary reformation zone and a feed to a convective heat transfer reformation zone, reforming the feed to the primary reformation zone by the combustion of fuel to provide at least a portion of the reformation heat of reaction by radiant heat, prereforming the feed to the convective heat transfer reformation zone by contacting it with a prereforming catalyst having a nickel content of at least 20 wt% and by heating it to a temperature of no greater than 1200° F. by indirect heat exchange with an elevated temperature reformate from the primary reformation zone and recovering a hydrogen and carbon monoxide-rich reformate from the primary reformation and the convective heat transfer reformation.

Preferably, the primary reformation is a steam-methane reformation. Alternatively, the primary reformation is an autothermal reformation. More specifically, the autothermal reformation is conducted with oxygen-enriched gas. Optimally, the oxygen-enriched gas is at least 95% oxygen.

The present invention is also directed to an apparatus for at least prereforming a hydrocarbon feed stream to produce a hydrogen and carbon monoxide-containing reformate, comprising a convective heat transfer reformer having discreet passageways for a process stream at an elevated temperature and discreet passageways for the hydrocarbon feed stream wherein the passageways for the feed stream contain a prereforming catalyst having a high nickel content and the passageways for the process stream and the passagesways for the feed stream are in indirect heat exchange relationship, an inlet to the convective heat transfer reformer for the feed stream connected to the feed stream passageways for supplying the hydrocarbon feed stream to the reformer and an outlet for the convective heat transfer reformer connected to the feed stream passageways for recovering a hydrogen and carbon monoxide-containing reformate from the reformer and an inlet to the convective heat transfer reformer for the process stream connected to the process stream passageways for supplying a heat source to the reformer and an outlet from the convective heat transfer reformer connected to the process stream passageways for removing the process stream from the reformer.

Exemplarily, the convective heat transfer reformer is connected to a primary reformer, having a reformate outlet which reformate outlet is connected to the process stream inlet of the convective heat transfer reformer to use the primary reformer reformate as a process stream heat source for the convective heat transfer reformer.

Exemplarily, the process stream outlet of the convective heat transfer reformer is connected to the reformate outlet of the convective heat transfer reformer, to comingle the primary reformer reformate and the convective heat transfer reformer reformate.

DETAILED DESCRIPTION OF THE INVENTION

The present invention combines prereforming technology with a convective heat transfer reformer to effectively reduce the physical size and heat transfer surface area requirements of a convective heat transfer reformer, which may be integrated with a conventional primary reformer, such as a steam-methane reformer, steam-hydrocarbon reformer, partial oxidation reformer, carbon dioxide-methane reformer or autothermal reformer for synthesis gas production. Prereforming is conducted in the presence of a prereforming catalyst having a nickel content equal or greater than twenty percent and at a temperature at or less than 1200° F. In contrast, conventional reforming is conducted potentially in the presence of a conventional reforming catalyst having a nickel content less than twenty percent if any catalyst is used and at temperatures greater than 1200° F. Prereforming processes involve the reaction of hydrocarbons with steam to produce various amounts of methane, hydrogen, carbon monoxide and carbon dioxide. Convective heat transfer reforming is conducted with indirect heat exchange with a heat source of sufficient temperature of at least 1200° F. in which the transfer of heat is predominantly convective in contrast to radiant and conductive heat transfer, and the reforming is conducted in the presence of an appropriate catalyst. The invention may use a split charge of catalyst to the convective heat transfer reformer. A prereforming catalyst containing greater than 20 wt% nickel is used at the feed gas inlet portion of the convective heat transfer reformer, where lower temperatures exist, while the remainder of those passageways for the feedstream and reformate contain conventional reforming catalyst, well known in the art.

The present invention will now be described in greater detail with reference to the drawings.

Figure 1:
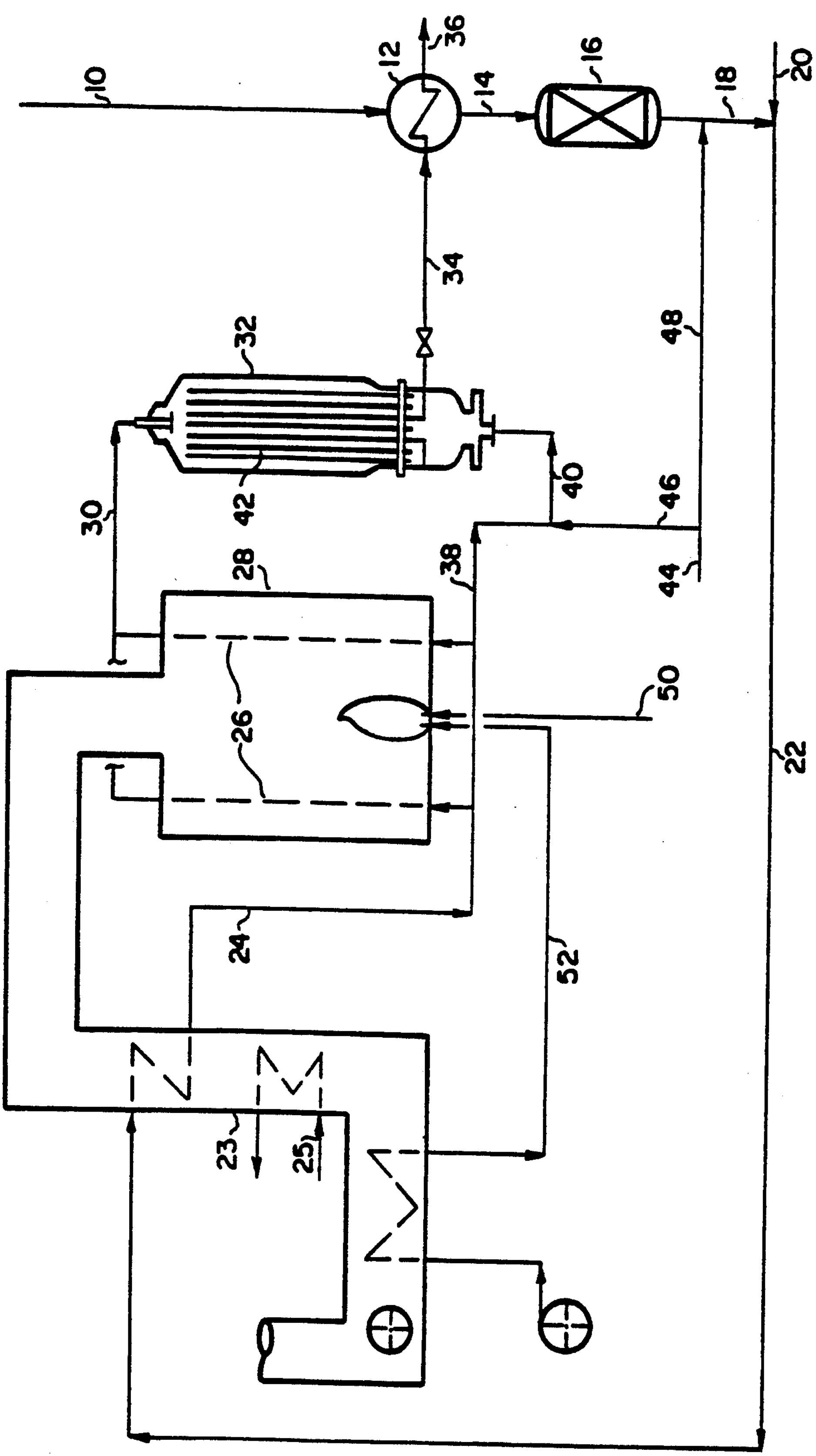
FIG. 1 is a schematic illustration of a first preferred embodiment of the present invention.

FIG. 1 illustrates a first preferred embodiment of an integrated steam-methane reformer and a convective heat transfer reformer containing prereforming catalyst. Natural gas in line 10 at 50 to 500 psia is heated to 650° to 750° F. in heat exchanger 12 against hot reformate 34, which leaves as a product 36 of the overall process. The natural gas feed in line 14 contains mostly methane with small amounts of nitrogen, carbon dioxide and higher hydrocarbons. Any sulfur present in the feed gas stream is removed in a solid adsorbent bed 16 which desulfurizes the feed. Process steam from line 44 is split and a portion in line 48 is mixed with the feed gas stream in line 18 to provide a steam to carbon ratio of 0.5 up to 3.5. Carbon dioxide in line 20 can be optionally added to the mixed feed in line 22 in ratios of 0.1 to 2.5 carbon dioxide to carbon content. The feed stream in line 22 is heated to 700° to 1200° F. in a convection section coil 23 against hot flue gas from a conventional steam-methane reformer 28. The feed stream is split into portions feeding the conventional steam-methane reformer 28 in conventional catalyst filled reformer tubes 26 and a feed stream 38 feeding the convective heat transfer reformer 32. The feed to the conventional steam-methane reformer 28 is heated and reformed at 1500° to 1800° F. by essentially radiant heat provided by the combustion of fuel gas 50 with air or oxygen-enriched gas in line 52. The hot steam-methane reformer reformate in line 30 is directed to the convective heat transfer reformer 32 to recover waste heat by convective heat transfer. The feed stream 38 to the convective heat transfer reformer is optionally mixed with additional process steam in line 46 to increase the steam to a carbon ratio to 3.0 up to 6.0. The feed stream 40 to the convective heat transfer reformer is heated and reformed while initially in contact with a prereforming catalyst containing at least 20 wt.% nickel in a plurality of catalyst packed reforming tubes 42. The prereforming catalyst is situated in the initial feed end of the catalyst tubes 42, wherein the feed stream is at lower prereforming temperatures while the remainder of the catalyst tube 42 contains conventional reforming catalyst which conducts the reformation at the higher temperatures, which the conventional reforming catalyst is capable of performing. The reformate from the convective heat transfer reformer tubes leaves the tubes at 1300° to 1600° F. The heat of reaction in the convective heat transfer reformer is provided by the waste heat recovered from the reformate leaving the conventional steam-methane reformer. The reformate from the convective heat transfer reformer tubes is mixed with the conventional steam-methane reformer reformate entering the convective heat transfer reformer 32 and leaves via a plurality of other or collection tubes connected to outlet 34. The combined reformates exit the convective heat transfer reformer at 750° to 1200° F. Depending on the products that are required, the combined and reformed gas proceeds to any combination of reactors, wasteheat recovery and purification equipment well known in the art.

Figure 2:
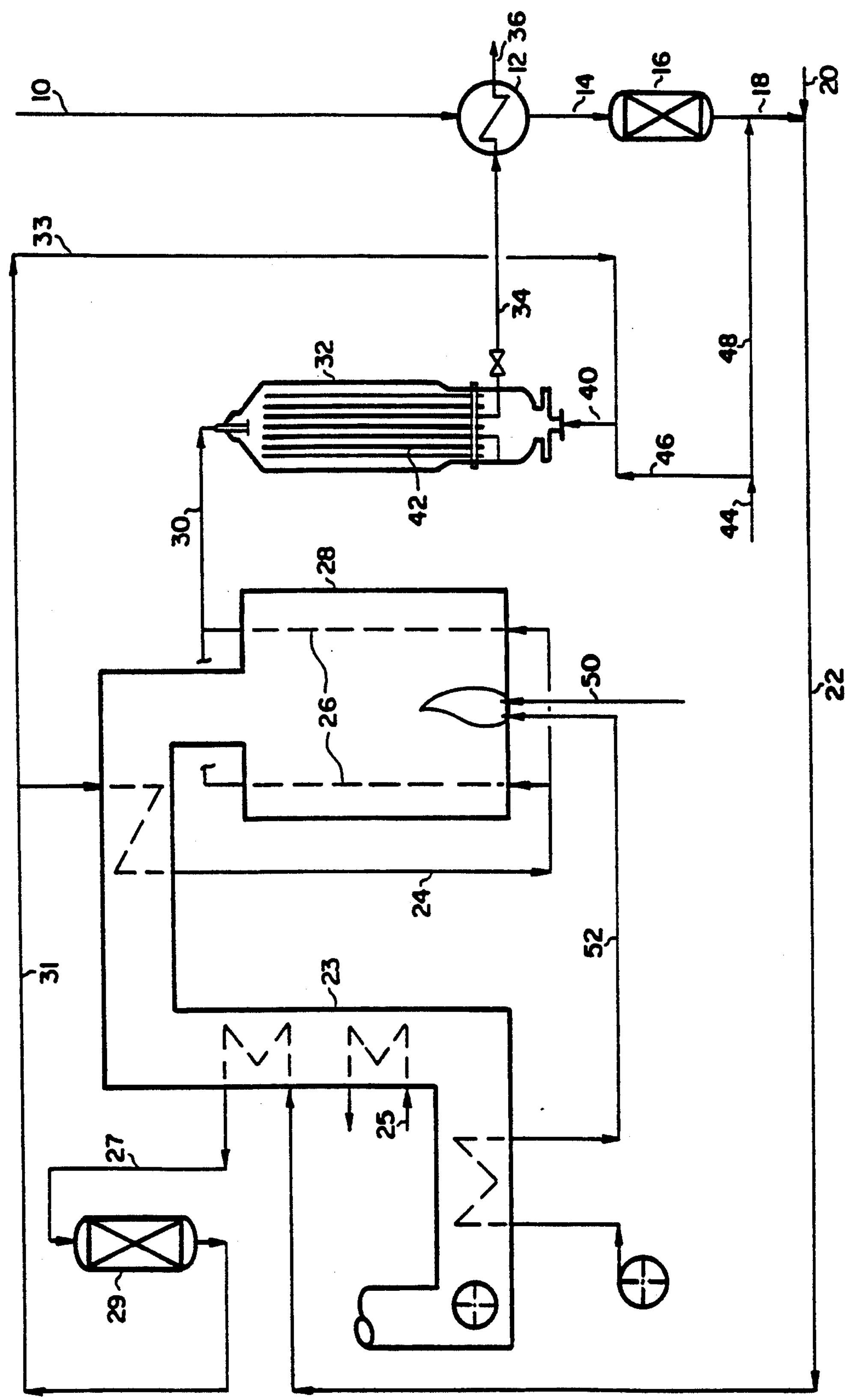
FIG. 2 is a schematic illustration of a second embodiment of the present invention.

A further embodiment of the present invention is illustrated in FIG. 2. This process integrates an adiabatic prereformer 29 into the steam-methane reformer and prereforming convective heat transfer reformer process identified and described with reference to FIG. 1 above. Similar parts are given similar numbers and functions as are described in FIG. 1. The difference in the flow schemes occurs in line 27 which takes the feed gas through the adiabatic prereformer 29 after being heated in the convective section coil 23 of the primary reformer 28 and passes the prereformed feed gas 31 to the primary reformer 28 via line 24 as described in FIG. 1, and another portion of the prereformed feed gas 33 to the prereforming convective heat transfer reformer 32 via line 40 as described with regard to FIG. 1. Integration of an adiabatic prereformer reactor upstream of both the conventional steam-methane reformer and prereforming convective heat transfer reformer further reduces the duty and physical size of the conventional primary reformer by about 5% and the prereforming convective heat transfer reformer by about 2.5%. The integrated synthesis gas plant of FIG. 2 also slightly lowers the overall fuel consumption.

In all of the above discussions, the steam-methane reformer could in fact be an autothermal reformer, both of which constitute what is known in the art as a primary reformer. In addition, although the convective heat transfer reformer has been described with regard to its function, greater detail in the description of one example of a convective heat transfer reformer is found in U.S. Pat. No. 4,919,844 for an enhanced heat transfer reformer, the entire text of which is hereby incorporated herein by reference.

The prereforming in at least the initial portions of the convective heat transfer reformation of the present invention should be conducted at a temperature less than or equal to 1200° F., with a catalyst containing 20 wt% or greater of nickel. More preferably, the prereforming temperature is in the approximate range of 800° to 1050° F. with a prereforming catalyst containing approximately 25 to 80 wt% nickel. Optimally, the prereforming reaction is conducted with a catalyst containing 25 to 60 wt% nickel. The feed stream can comprise hydrocarbons, such as natural gas, naptha and liquid petroleum gases. Preferably, the feed gas comprises a methane-rich gas stream. Preferably, the prereforming catalyst comprises nickel, alumina and ruthenium, optionally together with an oxide, hydroxide or carbonate of an alkali metal or alkaline earth metal, wherein the nickel content is in the above described ranges and the ruthenium content does not exceed 0.8% by weight of the weights of the other components of the catalyst.

The use of high weight percent nickel prereforming catalyst in place of conventional reforming catalysts in a convective heat transfer reformation at the feed gas inlet end of the reaction tubes or zone of the reformer, effectively reduces the surface area requirements of the convective heat transfer reformer. This will result in a smaller and less costly convective heat transfer reformer than one with a similar duty using only a conventional reforming catalyst.

Figure 3:
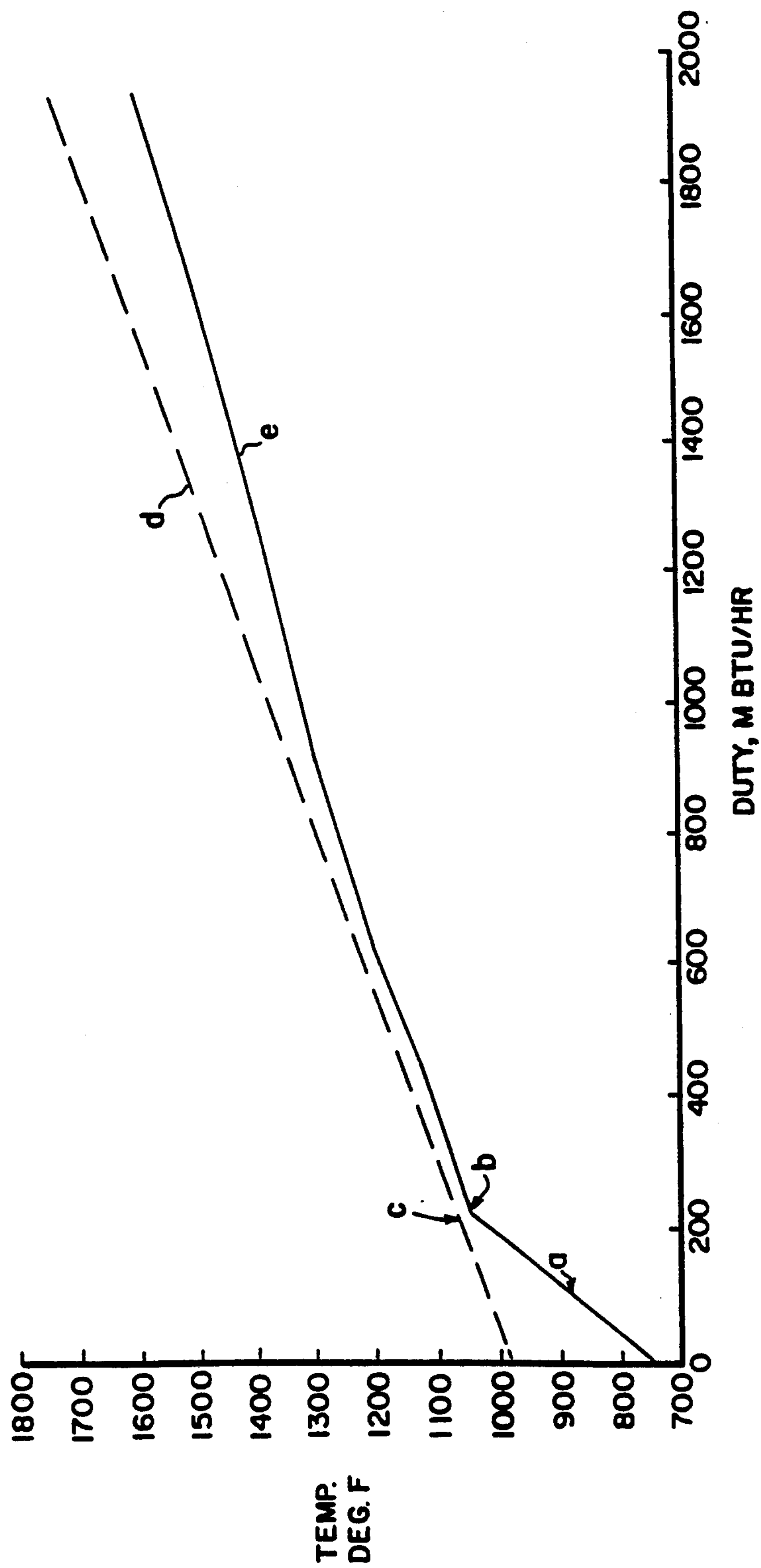
FIG. 3 is a cooling curve graph of a prior art convective heat transfer reformer using only conventional reforming catalyst.

FIG. 3 depicts a typical cooling curve for a convective heat transfer reformer using 100% conventional reforming catalyst. Process feed enters the catalyst filled tubes at 750° F. and is reformed as it is heated to 1600° F. Hot reformed gas entering the shell side at 1734° F. flows countercurrently, providing sensible heat and the heat of reaction with the feed gas while being cooled to 979° F. A total of 1.93 million BTU's per hour of heat duty is transferred. With conventional reforming catalyst, reforming of the feed gas begins at a temperature of approximately 1050° F. As indicated in FIG. 3, this creates a cooling curve temperature pinch of 22° F. between the cooling gas and warming gas. The heat transfer surface area requirement is 715 square feet based on the heat transfer coefficient of 50 BTU per hour foot squared ° F. In the cooling curve graph, the shell side or heating gas cooling curve is shown as curve "d", while the tube side or reforming feed gas is shown as curve "e". The reforming feed gas is heated using sensible heat transfer along the portion of the curve "a". Reforming of the components of the feed gas does not initiate until point "b" of the curve is reached. The difference between the cooling curves "d" and "e" reaches a minimum at point "c" which constitutes the 22° F. delta pinch point, which shows that on close matchup of the cooling curves at this stage of the initial reformation, a large amount of surface area will be necessary to transfer the heat because the diminished driving force of such closely matched cooling curves.

Figure 4:
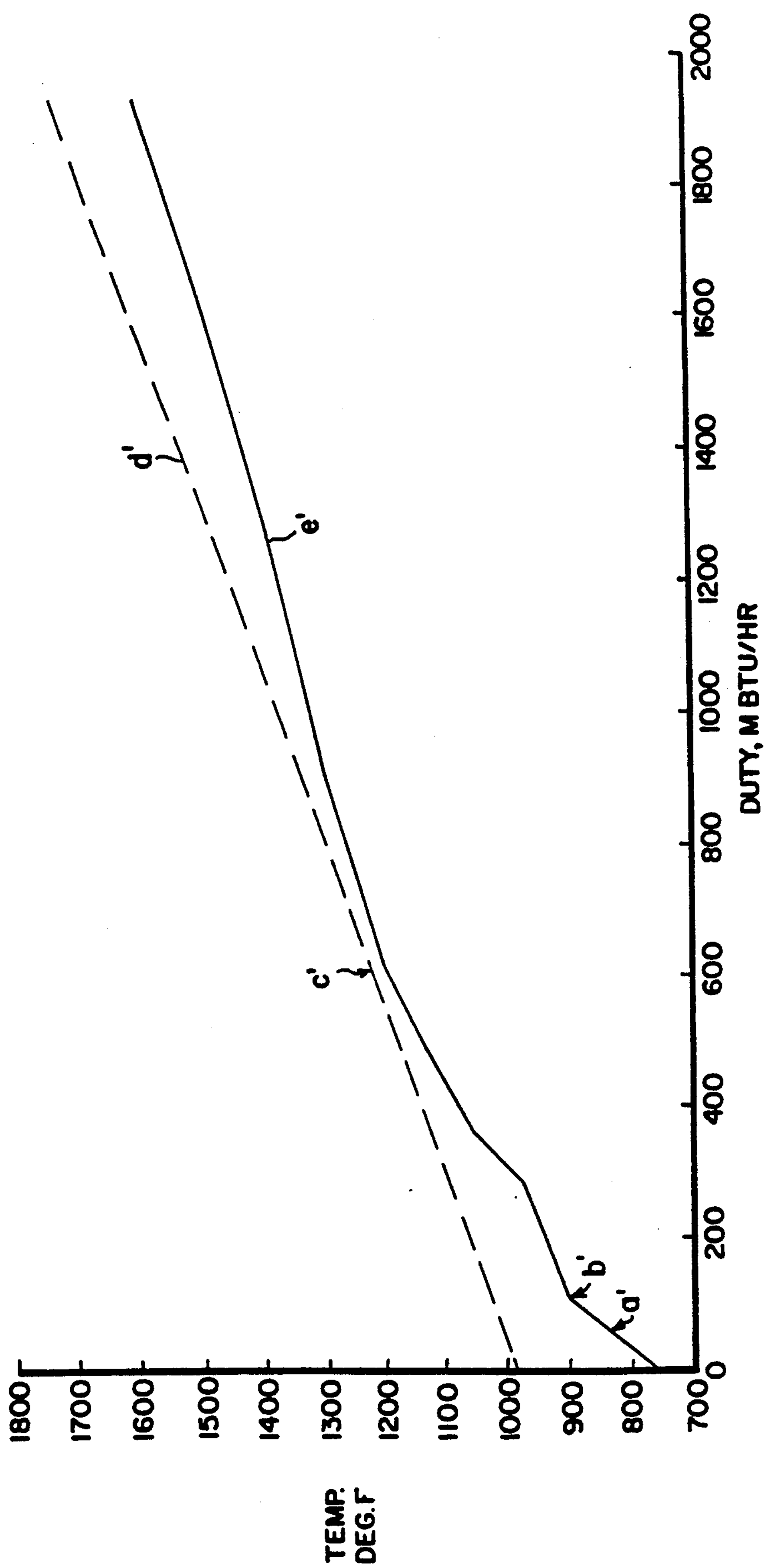
FIG. 4 is a cooling curve graph of the convective heat transfer reformer filled with prereformer catalyst of the present invention at its feed end and conventional reformer catalyst at the downstream end.

FIG. 4 depicts the cooling curve for a convective heat transfer reformer of the present invention, containing a split charge of prereforming catalyst in initial portions of the reformation zone or reformer tubes and more conventional reforming catalyst in the remainder of the reformation zone or reformer tubes. The use of prereforming catalyst in the reformation zone inlet sections or the initial passageways of the reformer, initiates reforming at a temperature of about 900° F. This results in the cooling curve for a convective heat transfer reformer with a greater temperature driving force for the same heat transfer duty. A surface area requirement of 550 square feet is estimated based upon a heat transfer coefficient of 50 BTU per hour foot squared ° F. In FIG. 4, the points on the graphs are analagous to that for FIG. 3, wherein "d'" is the cooling curve for the process stream giving up waste heat convectively as a heat source, and curve "e'" is the cooling curve for the feedstream being reformed. It is noted that the portion of the cooling curve of "e'" utilized for sensible heat transfer identified as "a'", is shorter and the beginning of reformation at "b'" is earlier and at a greater temperature delta than with regard to conventional reforming illustrated in FIG. 3. In fact, the temperature pinch point of 29° F. does not occur until point "c'" at 1200° F. The opened delta between the cooling curves occurring between "b'" and "c'" provides greater driving force for heat transfer, and therefore minimizes the necessary heat exchange surface area, reducing capital costs. The difference as calculated between FIG. 3 and FIG. 4 reformation constitutes a 23% reduction in the estimated surface area required for the design of the process of the present invention using prereforming technology in a convective heat transfer reformer and that of conventional convective transfer reforming. The number of reformer passageways, their length, or both can be decreased resulting in a lower convective heat transfer capital cost, or alternatively in retrofitting an existing convective heat transfer reformer with the concept of the present invention using prereforming in an initial portion of the passageways or reformation zone, an increase in the heat transfer duty can be realized decreasing the overall plant fuel requirements.

The present invention uses a charge of prereforming catalyst at the passageway inlet or initial reformation zone of a convective heat transfer reformer to initiate reformer reaction at a lower temperature. Prereforming catalyst is a specially manufactured nickel alumina mixture which has a much higher activity for hydrocarbon-steam reforming at low temperature than does conventional reforming catalyst. When the reforming reaction in a convective heat transfer reformer is initiated at a lower temperature, the convective heat transfer efficiency of the reactor is improved by increasing the temperature driving force between the passageways or reformation zone for the feed stream to be prereformed in the convective heat transfer reformer and the shell side or passageways of the process stream providing convective waste heat as a heat source in the convective heat transfer reformer.

The present invention has been described with reference to several preferred embodiments, however the full scope of the present invention should be ascertained from the claims which follow.

I claim:

1. A process for prereforming and primary reforming a methane-containing hydrocarbon feed stream to produce a hydrogen and carbon monoxide reformate comprising:

(a) preheating a methane-containing hydrocarbon feed stream against an elevated temperature process stream;
(b) mixing the preheated feed stream with steam;
(c) splitting the mixed stream into a feed to a primary reformation zone and a feed to a convective heat transfer prereformation zone;
(d) reforming the feed to the primary reformation zone by the combustion of fuel to provide at least a portion of the reformation heat of reaction by radiant heat;
(e) prereforming the feed to the convective heat transfer reformation zone by contacting it with a prereforming catalyst having a nickel content of at least 20 weight percent and by heating it essentially convectively to a temperature of no greater than 1200° F. by juxtaposed indirect heat exchange with the elevated temperature reformate from the primary reformation zone; and
(f) recovering a hydrogen and carbon monoxide-rich reformate from the primary reformation and the convective heat transfer reformation.

2. The process of claim 1 wherein the hydrocarbon feed stream is substantially methane.

3. The process of claim 1 wherein the hydrocarbon feed stream contacts a prereforming catalyst in an initial portion of the convective heat transfer reformation zone and contacts a conventional reforming catalyst in the remainder of the convective heat transfer reformation zone.

4. The process of claim 1 wherein the prereformation is conducted at a temperature in the range of approximately 800°-1050° F.

5. The process of claim 1 wherein the prereforming catalyst has a nickel content of approximately 25-80 weight percent.

6. The process of claim 1 wherein the prereforming catalyst has a nickel content of approximately 25-60 weight percent.

7. The process of claim 1 wherein the primary reformation is a steam-methane reformation.

8. The process of claim 1 wherein the primary reformation is an autothermal reformation.

9. The process of claim 8 wherein the autothermal reformation is conducted with oxygen-enriched gas.

10. The process of claim 9 wherein the oxygen-enriched gas is at least 95% oxygen.

* * * * *